United States Patent
Sakata et al.

(10) Patent No.: US 7,946,708 B2
(45) Date of Patent: May 24, 2011

(54) DISPLAY DEVICE THAT PROJECTS A VIRTUAL IMAGE DISPLAY

(75) Inventors: Hidefumi Sakata, Tatsuno-cho (JP); Susumu Aruga, Shiojiri (JP); Takayuki Matsubara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 670 days.

(21) Appl. No.: 11/970,920

(22) Filed: Jan. 8, 2008

(65) Prior Publication Data

US 2008/0174850 A1   Jul. 24, 2008

(30) Foreign Application Priority Data

Jan. 23, 2007   (JP) .................... 2007-012271

(51) Int. Cl.
*G03B 21/00* (2006.01)
*G02B 27/14* (2006.01)

(52) U.S. Cl. .................. 353/13; 359/630
(58) Field of Classification Search .......... 353/31, 353/13; 359/9, 630; 348/750–752, 759–761
See application file for complete search history.

(56) References Cited

U.S. PATENT DOCUMENTS

| | | | |
|---|---|---|---|
| 3,915,548 A * | 10/1975 | Opittek et al. ............ 345/7 |
| 4,362,364 A * | 12/1982 | Smith ............ 359/305 |
| 5,200,844 A * | 4/1993 | Suvada ............ 349/11 |
| 2006/0007055 A1 * | 1/2006 | Larson et al. ............ 345/8 |
| 2007/0024999 A1 * | 2/2007 | Crossland et al. ............ 359/859 |

FOREIGN PATENT DOCUMENTS

| | | |
|---|---|---|
| JP | A-60-192912 | 10/1985 |
| JP | A-06-027411 | 2/1994 |
| JP | A 06-043392 | 2/1994 |
| JP | A-08-262962 | 10/1996 |
| JP | A-10-228042 | 8/1998 |
| JP | A-11-003128 | 1/1999 |
| JP | A-11-231762 | 8/1999 |

OTHER PUBLICATIONS

Huebschman et al., "Dynamic holographic 3-D image projection," *Optics Express*, 2003, vol. 11. No. 5, pp. 437-445.

* cited by examiner

*Primary Examiner* — Thanh X Luu
(74) *Attorney, Agent, or Firm* — Oliff & Berridge PLC

(57) ABSTRACT

A display device includes a light source that supplies light, a phase modulator that modulates the phase of the light from the light source to form an image, and an imaging optical system that focuses the image formed through the modulation performed by the phase modulator. The phase modulator produces diffracted light according to a phase modulation pattern while changing the phase of the light so as to form an intermediate image between the phase modulator and the imaging optical system, and the phase modulator also changes the position of the intermediate image.

6 Claims, 3 Drawing Sheets

DISPLAY DEVICE THAT PROJECTS A VIRTUAL IMAGE DISPLAY

BACKGROUND

1. Technical Field

The present invention relates to a display device, and particularly to a technology for a display device that projects a virtual image display.

2. Related Art

There have been proposed head-up displays that directly project a display in the field of view of a user. A known example of such a head-up display is an in-vehicle display device that projects a display of an indicator or the like in the field of view of the driver. By projecting a display in the field of view of the driver, the amount of sightline movement of during driving can be reduced. Further, by setting the position where the display is focused to be distant from the driver, it is possible to reduce the difference between the position of an object viewed through the windshield and the position where the virtual image is focused, allowing the display to be more easily viewed. Moreover, by changing the position where the virtual image is focused, the image can be displayed as if it moves as the vehicle travels. For example, JP-A-6-43392 proposes a technology for changing the position where the virtual image is focused. In the technology proposed in JP-A-6-43392, movement of the modulation unit of a CRT or a lens that is part of the projection optical system is used to change the position where the virtual image is focused.

SUMMARY

In the technology proposed in JP-A-6-43392, a moving mechanism is essential to move at least one of optical elements. Not only to simplify the configuration, but also to provide reliable, high optical performance, it is desirable to employ a configuration in which the position where the virtual image is focused can be changed with no mechanically moving mechanism. An advantage of some aspects of the invention is to provide a display device that displays a virtual image at various reproduction positions with no mechanically moving mechanism.

A display device according to an aspect of the invention includes a light source that supplies light, a phase modulator that modulates the phase of the light from the light source to form an image, and an imaging optical system that focuses the image formed through the modulation performed by the phase modulator. The phase modulator produces diffracted light according to a phase modulation pattern while changing the phase of the light so as to form an intermediate image between the phase modulator and the imaging optical system. The phase modulator also changes the position of the intermediate image.

The phase modulator not only modulates the phase of the light to form an image but also changes the position of the intermediate image. The intermediate image formed between the phase modulator and the imaging optical system is observed as a virtual image through the imaging optical system. By changing the position and the size of the intermediate image, the virtual image can be displayed at various reproduction positions with various sizes. The use of the phase modulator to modulate the phase of the light allows the position where the virtual image is reproduced to be changed with no mechanically moving mechanism. The use of the phase modulator allows the position and the size of the intermediate image to be easily changed, so that the reproduction position and the size of the virtual image can be freely set. There is thus provided a display device that displays a virtual image at various reproduction positions with no mechanically moving mechanism.

It is preferable that the phase modulator desirably includes liquid crystal elements. The use of the liquid crystal elements allows the light phase modulation pattern to be easily changed by controlling voltage application.

It is preferable that each of the liquid crystal elements is desirably a liquid crystal element driven in the field control birefringence mode. Such a liquid crystal element allows high-speed response of the phase modulator and sufficient phase modulation with a low drive voltage.

It is preferable that the light source desirably supplies coherent light. The use of coherent light allows the phase modulator to provide an excellent diffraction characteristic.

It is preferable that the display device desirably further includes a partial transmission mirror that transmits part of the light from the imaging optical system and reflects the other part of the light. This configuration allows the viewer to observe the space on the opposite side of the partial transmission mirror and the virtual image at the same time.

It is preferable that the first-order diffracted light is desirably used to form an image. The use of the first-order diffracted light to form an image can prevent only part of the image from being bright when the amount of the zero-order diffracted light is greater than that of the first-order diffracted light. Thus, an image having an excellent light intensity distribution can be obtained.

It is preferable that the imaging optical system is desirably disposed at a position where the zero-order diffracted light from the phase modulator is not incident. This configuration allows an image to be formed by using the first-order diffracted light.

It is preferable that the display device desirably further includes an optical separator that separates the zero-order diffracted light and the first-order diffracted light coming from the phase modulator from each other. In this configuration, the zero-order diffracted light is deviated from the imaging optical system, and only the first-order diffracted light can easily travel toward the imaging optical system.

BRIEF DESCRIPTION OF THE DRAWINGS

The invention will now be described with reference to the accompanying drawings, wherein like numbers refer to like elements.

DESCRIPTION OF EXEMPLARY EMBODIMENTS

An embodiment of the invention will be described below in detail with reference to the drawings.

Figure 1:
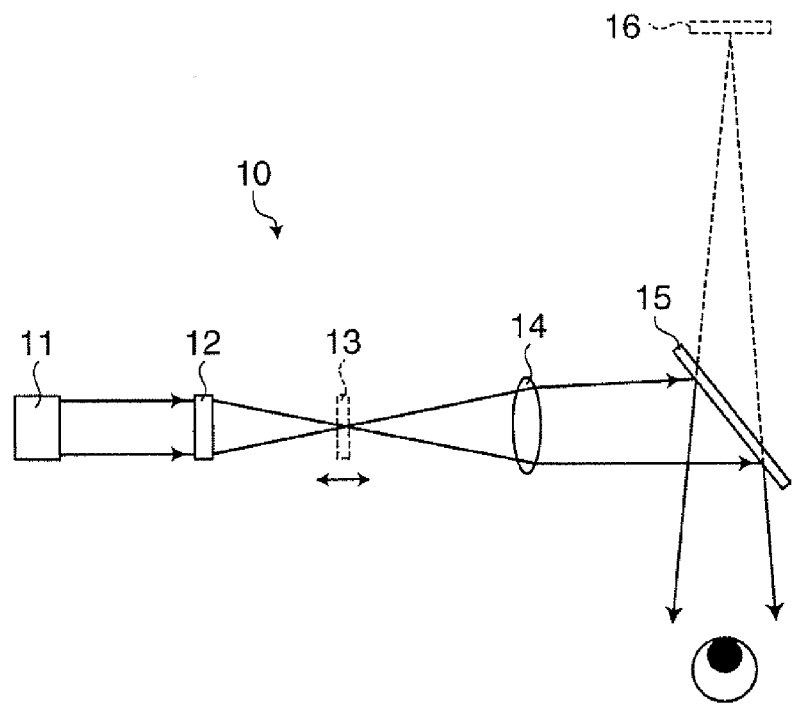
FIG. 1 shows a schematic configuration of the display device according to an embodiment of the invention.

FIG. 1 shows a schematic configuration of a display device 10 according to the embodiment of the invention. A light source 11 is a semiconductor laser that supplies coherent laser light. The light source 11 may have a configuration using a wavelength converter, such as a second harmonic generation (SHG) element, which converts the wavelength of the laser light from a semiconductor laser. The light source 11 may be a diode pumped solid state (DPSS) laser, solid state laser, liquid laser, gas laser or the like instead of the semiconductor laser.

The laser light from the light source 11, which is collimated light, is incident on a phase modulator 12. The phase modulator 12 is a transmissive liquid crystal panel with a plurality of liquid crystal elements (not shown) corresponding to pixels. The phase modulator 12 modulates the phase of the laser light from the light source 11 to form an image. The phase modulator 12 produces diffracted light according to a phase modulation pattern. Since coherent laser light is incident on the phase modulator 12, the phase modulator 12 can provide an excellent diffracted characteristic.

Figure 2:
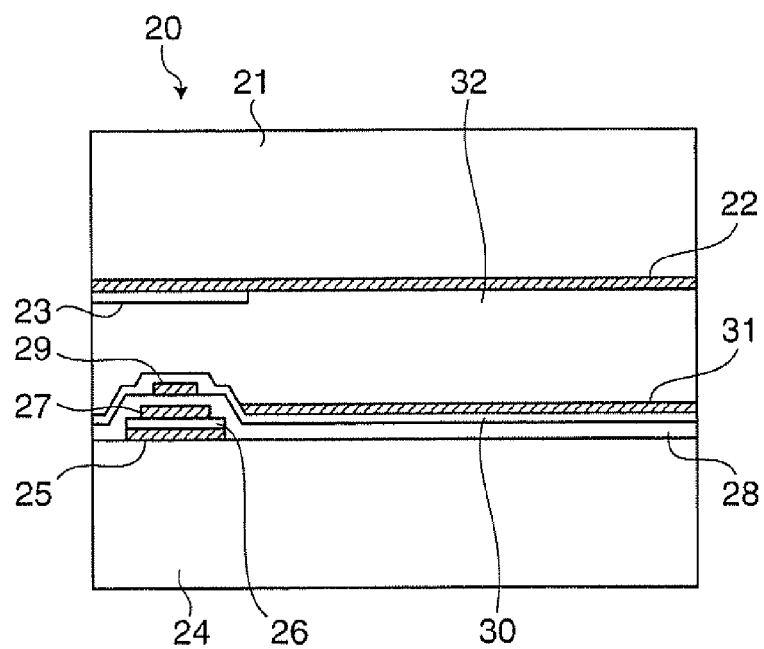
FIG. 2 shows a cross-sectional configuration of a liquid crystal element.

FIG. 2 shows a cross-sectional configuration of the liquid crystal element 20 provided in the phase modulator 12 shown in FIG. 1. The liquid crystal element 20 has a configuration in which a first transparent substrate 21 and a second transparent substrate 24 encapsulate a liquid crystal layer 32. A first transparent electrode 22 is formed between the first transparent substrate 21 and the liquid crystal layer 32. The first transparent electrode 22 can be made of, for example, ITO or IZO, which is a metal oxide. A light blocking layer 23 is provided in part of the region between the first transparent electrode 22 and the liquid crystal layer 32. Additionally, a rubbed orientation film (not shown) is formed.

A semiconductor layer 25 is formed in part of the region above the second transparent substrate 24. A gate insulating film 26 is formed on the semiconductor layer 25, and a gate electrode 27 is formed on the gate insulating film 26. These portions form a thin film transistor (TFT), and portions of the semiconductor layer 25 are used as the source and the drain of the TFT. An insulating film 28 made of silicon oxide or the like is formed on the second transparent substrate 24 and the TFT. A signal line 29 is provided above the TFT via the insulating film 28. The signal line 29 is connected to the source of the TFT. A scan line (not shown) is connected to the gate electrode 27, which is the gate of the TFT.

A PSG (phosphosilicate glass) film 30 is formed on the insulating film 28, the signal line 29, and the scan line. A second transparent electrode 31 is provided on the portion of the PSG film 30 other than the portion corresponding to the TFT. The second transparent electrode 31 can be made of ITO or IZO as in the first transparent electrode 22. The TFT and the second transparent electrode 31 are formed in each of the pixels. Additionally, an orientation film is also formed on the second transparent substrate 24 side. The rubbing direction of the orientation film on the second transparent substrate 24 side is parallel but opposite to the rubbing direction of the orientation film on the first transparent substrate 21 side, allowing the liquid crystal elements 20 to be uniformly oriented as a whole.

Each of the liquid crystal elements 20 transmits the light sequentially through the first transparent substrate 21, the first transparent electrode 22, the liquid crystal layer 32, and the second transparent electrode 31, and the light exits from the second transparent substrate 24. The liquid crystal elements 20 are disposed in such a way that the direction in which the laser light incident on the first transparent substrate 21 is polarized coincides with the direction in which the liquid crystal molecules on the first transparent substrate 21 side are orientated. The laser light from the light source 11 (see FIG. 1) can thus be efficiently incident on the liquid crystal elements 20.

The phase modulator 12 is driven, for example, in the active matrix method. The liquid crystal element 20 can use a liquid crystal material driven in the field control birefringence mode, such as a nematic liquid crystal material. Use of a liquid crystal material having a low molecular weight and relatively high birefringence allows high-speed response of the phase modulator 12 and sufficient phase modulation with a low drive voltage. The liquid crystal element 20 may use any of liquid crystal materials other than a nematic liquid crystal material as long as they are driven in the field control birefringence mode.

Referring back to FIG. 1, the phase modulator 12 produces diffracted light according to the phase modulation pattern while changing the phase of the light so as to form an intermediate image 13. The intermediate image 13 is formed between the phase modulator 12 and an imaging optical system 14. The light from the phase modulator 12 is incident on the imaging optical system 14. The imaging optical system 14 focuses the image formed through the modulation performed by the phase modulator 12. By forming the intermediate image 13 at a position closer to the imaging optical system 14 than the focal point thereof, a virtual image 16 of the intermediate image 13 is reproduced through the imaging optical system 14. The imaging optical system 14 may have a configuration using a focusing lens.

The light from the imaging optical system 14 is incident on a partial transmission mirror 15. The partial transmission mirror 15 transmits part of the light from the imaging optical system 14 and reflects the other part of the light. The partial transmission mirror 15 can be formed by coating a dielectric multilayer film on a transparent glass member or the like. The portion of the light from the imaging optical system 14 that is reflected off the partial transmission mirror 15 travels toward the viewer. Such a configuration allows the viewer to observe the virtual image 16 of the intermediate image 13 formed by the phase modulator 12. The display of the virtual image 16 is presented at a position on the opposite side of the partial transmission mirror 15 along the extension of the reflected light ray from the partial transmission mirror 15.

The portion of the light incident on the partial transmission mirror 15 from the opposite side to the viewer that passes through the partial transmission mirror 15 travels toward the viewer. Such a configuration allows the viewer to observe the space on the opposite side of the partial transmission mirror 15 and the virtual image 16 at the same time. By thus projecting the display in the field of view of the viewer, it is possible, for example, to reduce the amount of movement of the sight-line of the viewer. Further, by setting the position where the virtual image is reproduced to be distant from the viewer, it is possible to reduce the distance between objects on the opposite side of the partial transmission mirror 15 and the virtual image 16, allowing the display to be more easily viewed.

The phase modulator 12 changes the phase of the light to change the position of the intermediate image 13. For example, by setting in advance phase modulation patterns, through which the intermediate image 13 is formed at different positions, in the driver of the phase modulator 12, the phase modulator 12 can change the position of the intermediate image 13. By shifting the position of the intermediate image 13 forward and backward along the light traveling direction as indicated by the double-headed arrow in the figure, the virtual image 16 can be focused and displayed at a different position. By changing the position where the virtual image 16 is focused, the position where the virtual image 16 is reproduced can be changed in the depth direction when viewed from the viewer. Further, by changing the size of the intermediate image 13, the size of the virtual image 16 can be changed.

The display device 10 of the invention uses the phase modulator 12 to modulate the phase of the light, allowing the position where the virtual image 16 is reproduced to be changed with no mechanically moving mechanism. The use of the phase modulator 12 allows the position and the size of the intermediate image 13 to be easily changed. When the position and the size of the intermediate image 13 can be easily changed, the reproduction position and the size of the virtual image 16 can be freely set. There is thus provided an advantage of displaying the virtual image 16 at various reproduction positions with no mechanically moving mechanism.

The display device 10 of the invention is useful, for example, when applied to a navigation system that displays route guidance information and the like on the windshield of a vehicle as well as a night vision system that projects human figures and the like captured by an infrared camera onto the windshield of a vehicle. The use of the phase modulator 12 is not limited to the case where the position of the intermediate image 13 is changed along the light traveling direction, but the phase modulator 12 may change the position of the intermediate image 13 along two-dimensional directions including another direction substantially perpendicular to the light traveling direction. In this case, the position where the virtual image 16 is reproduced can be changed in the two-dimensional directions. The display device 10 may have a configuration in which the partial transmission mirror 15 is omitted and the viewer directly looks at the light from the imaging optical system 14.

Figure 3:
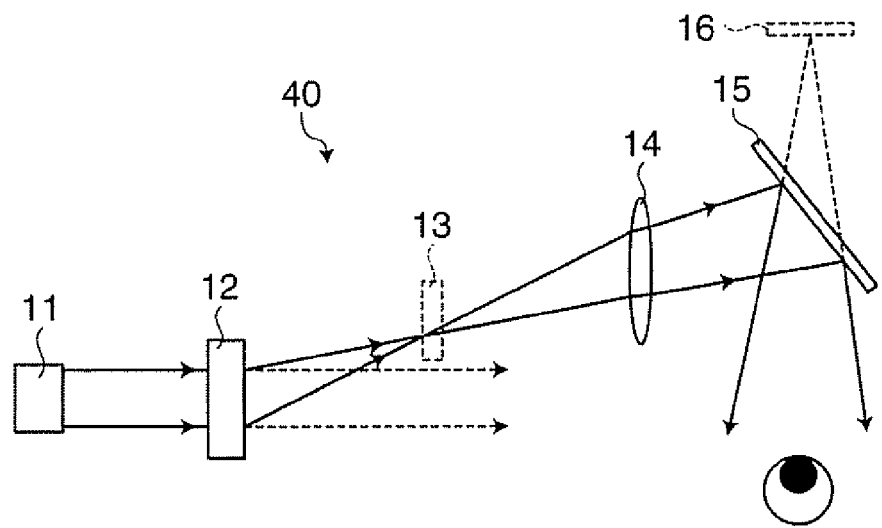
FIG. 3 shows a schematic configuration of the display device according to a first variation of the embodiment.

FIG. 3 shows a schematic configuration of a display device 40 according to a first variation of this embodiment. The display device 40 of this variation is characterized in that the first-order diffracted light from the phase modulator 12 is used to form the intermediate image 13. In the phase modulator 12, the zero-order diffracted light travels straight forward as indicated by the broken lines, while the first-order diffracted light travels in an oblique direction as indicated by the solid lines, so that the zero-order diffracted light and the first-order diffracted light are separated from each other. The phase modulator 12 uses the first-order diffracted light traveling in the oblique direction to form the intermediate image 13.

The imaging optical system 14 is disposed at a position where the first-order diffracted light from the phase modulator 12 is incident but the zero-order diffracted light from the phase modulator 12 is not incident. The phase modulator 12 may have a configuration in which a large diffraction angle is obtained for the first-order diffracted light so that only diffracted light is incident on the imaging optical system 14. The phase modulator 12 can provide a large diffraction angle for the first-order diffracted light by arranging the liquid crystal elements 20 (see FIG. 2) at small intervals. The use of the first-order diffracted light to form the intermediate image 13 can prevent the zero-order diffracted light and the first-order diffracted light from being superimposed and only part of the virtual image 16 from being bright when the amount of the zero-order diffracted light is greater than that of the first-order diffracted light. A virtual image 16 with an excellent light intensity distribution can be thus obtained.

Figure 4:
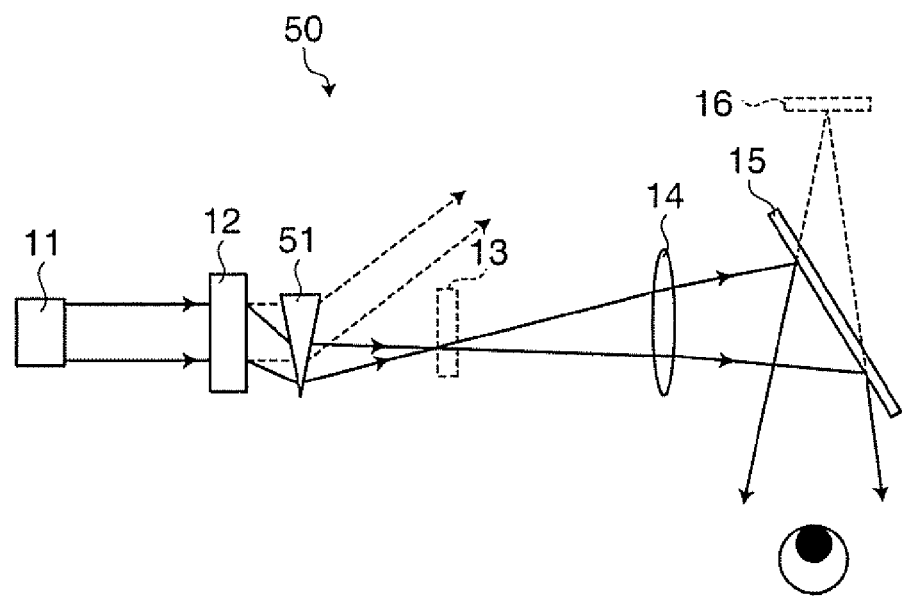
FIG. 4 shows a schematic configuration of a display device having a prism.

A display device 50 shown in FIG. 4 has a prism 51 provided between the phase modulator 12 and the imaging optical system 14. The prism 51 is a triangular prism formed of a transparent member. Due to the refraction occurring in the prism 51, the zero-order diffracted light from the phase modulator 12 travels in an oblique direction, while the first-order diffracted light from the phase modulator 12 travels straight forward. The prism 51 is an optical separator that separates the zero-order diffracted light and the first-order diffracted light coming from the phase modulator 12 from each other.

The display device 50 using the prism 51 may have a configuration in which the first-order diffracted light travels straight forward. Such a configuration easily allows only the first-order diffracted light to travel toward the imaging optical system 14. The prism 51 may be a prism other than a triangular prism. The optical separator may use optical elements other than the prism 51 as long as they can separate the zero-order diffracted light and the first-order diffracted light from each other. The optical separator is not limited to that having a configuration in which the first-order diffracted light travels straight forward, but may have a configuration in which the first-order diffracted light travels in an oblique direction. The optical separator is useful particularly when it is difficult to obtain a large diffraction angle in the phase modulator 12.

Figure 5:
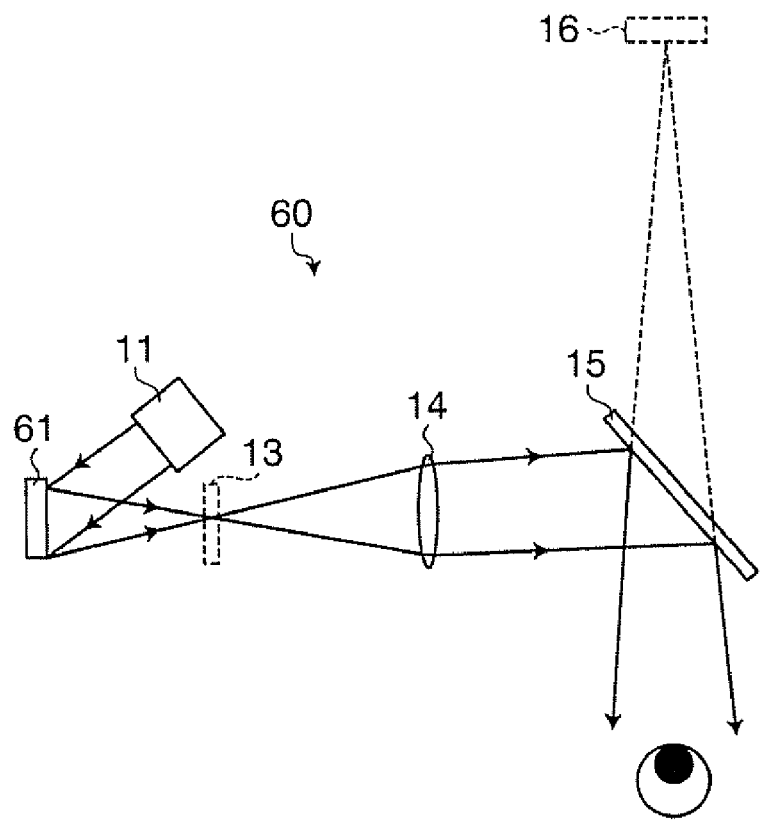
FIG. 5 shows a schematic configuration of the display device according to a second variation of the embodiment.

FIG. 5 shows a schematic configuration of a display device 60 according to a second variation of this embodiment. The display device 60 of this variation includes a phase modulator 61, which is a reflective liquid crystal panel. The phase modulator 61 reflects the laser light from the light source 11 to produce diffracted light according to a phase modulation pattern. The display device 60, which uses the phase modulator 61 to reflect the laser light and produce diffracted light, can also display a virtual image 16 at various reproduction positions.

As described above, the display devices according to the invention are useful as a display device for projecting a virtual image display.

The entire disclosure of Japanese Patent Application No. 2007-012271, filed Jan. 23, 2007 is expressly incorporated by reference herein.

What is claimed is:

1. A display device comprising:
   a light source that supplies light;
   a phase modulator that modulates the phase of the light from the light source to form an image;
   an imaging optical system that focuses the image formed through the modulation performed by the phase modulator; and
   a partial transmission mirror that reflects a part of the light emitted from the imaging optical system and causes the part of the light to travel toward a viewer,
   wherein the phase modulator produces diffracted light according to a phase modulation pattern while changing the phase of the light so as to form an intermediate image between the phase modulator and the imaging optical system, and the phase modulator moves the intermediate image forward and backward along an axis defined by a propagation path of the light between the phase modulator and the imaging optical system,
   the phase modulator uses first-order diffracted light to form an image, and
   the imaging optical system is disposed at a position where zero-order diffracted light from the phase modulator is not incident.

2. The display device according to claim 1, wherein the phase modulator includes liquid crystal elements.

3. The display device according to claim 2, wherein each of the liquid crystal elements is a liquid crystal element driven in the field control birefringence mode.

4. The display device according to claim 1, wherein the light source supplies coherent light.

5. The display device according to claim 1, further comprising an optical separator that separates the zero-order diffracted light and the first-order diffracted light coming from the phase modulator from each other.

6. The display device according to claim 1, wherein the phase modulator moves the position of the intermediate image and changes a size of the intermediate image.

* * * * *